(12) United States Patent
Longua et al.

(10) Patent No.: US 10,457,142 B2
(45) Date of Patent: Oct. 29, 2019

(54) VARIABLE SPEED ONBOARD AUXILIARY POWER SYSTEM FOR AN AGRICULTURAL IMPLEMENT

(71) Applicant: CNH Industrial America LLC, New Holland, PA (US)

(72) Inventors: Robert Longua, Palatine, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 26 days.

(21) Appl. No.: 15/801,834

(22) Filed: Nov. 2, 2017

(65) Prior Publication Data
US 2019/0126749 A1     May 2, 2019

(51) Int. Cl.
| | | |
|---|---|---|
| B60K 25/02 | (2006.01) | |
| A01B 71/00 | (2006.01) | |
| B60R 16/03 | (2006.01) | |
| A01C 19/02 | (2006.01) | |
| A01D 69/02 | (2006.01) | |
| A01B 76/00 | (2006.01) | |

(52) U.S. Cl.
CPC .............. *B60K 25/02* (2013.01); *A01C 19/02* (2013.01); *A01D 69/02* (2013.01); *B60R 16/03* (2013.01); *A01B 71/00* (2013.01); *A01B 76/00* (2013.01); *B60K 2025/026* (2013.01)

(58) Field of Classification Search
CPC ......... A01B 76/00; A01B 71/00; B60R 16/03; B60K 25/02
See application file for complete search history.

(56) References Cited

U.S. PATENT DOCUMENTS

| | | | |
|---|---|---|---|
| 2,953,691 A | 9/1960 | Rapp | |
| 2,955,210 A | 10/1960 | Dean et al. | |
| 7,484,583 B2 | 2/2009 | Akasam et al. | |
| 2002/0124539 A1* | 9/2002 | Van der Lely | A01B 67/00 56/10.2 B |
| 2006/0230754 A1* | 10/2006 | Foster | A01B 67/00 60/446 |
| 2010/0064649 A1* | 3/2010 | Harada | A01D 43/0631 56/10.2 R |
| 2010/0161479 A1* | 6/2010 | Littrell | G06Q 20/102 705/40 |
| 2012/0010042 A1* | 1/2012 | Ha | F16H 61/0213 477/15 |

(Continued)

*Primary Examiner* — Alfonso Perez Borroto
*Assistant Examiner* — Esayas G Yeshaw
(74) *Attorney, Agent, or Firm* — Rebecca L. Henkel; Rickard K. DeMille

(57) ABSTRACT

An auxiliary power system for an agricultural implement includes a variable speed hydraulic drive motor configured for receiving hydraulic oil from a tow vehicle, an electric alternator coupled with and driven by the hydraulic drive motor, and at least one auxiliary electrical component onboard the implement which is coupled with and adapted to receive electrical power from the alternator. At least one load indicator provides an indication of a dynamic cumulative electrical load of the one or more auxiliary electrical components. An electrical processing circuit is coupled with the at least one load indicator and the hydraulic drive motor, and is configured to vary the speed of the hydraulic drive motor, dependent on the indicated dynamic cumulative electrical load.

14 Claims, 2 Drawing Sheets

(56) References Cited

U.S. PATENT DOCUMENTS

| | | | |
|---|---|---|---|
| 2012/0190554 A1* | 7/2012 | Hartig | B60L 11/08 505/166 |
| 2013/0076120 A1* | 3/2013 | Wagner | B64D 33/00 307/9.1 |
| 2014/0262585 A1* | 9/2014 | Tippery | B60K 23/08 180/252 |
| 2015/0222121 A1* | 8/2015 | Kuttel | H02J 3/00 322/8 |
| 2016/0072363 A1 | 3/2016 | Torney et al. | |
| 2016/0230785 A1 | 8/2016 | Boisvert et al. | |
| 2018/0127104 A1* | 5/2018 | Kobayashi | B64D 27/24 |

* cited by examiner

VARIABLE SPEED ONBOARD AUXILIARY POWER SYSTEM FOR AN AGRICULTURAL IMPLEMENT

BACKGROUND OF THE INVENTION

1. Field of the Invention

The present invention relates to agricultural implements, and, more specifically to auxiliary power systems used with such implements.

2. Description of the Related Art

Work vehicles may be used in the agricultural, construction, industrial and forestry technology sectors, and are typically used to perform some type of work activity. A work vehicle in the form of an agricultural tractor is typically used to provide towing, Power Take-Off (PTO), and/or hydraulic power. For example, an agricultural tractor may be used to tow an implement such as a planter, seeder, drill, sprayer, field cultivator, etc.

Work vehicles typically include a power unit in the form of an internal combustion (IC) engine. The IC engine may either be in the form of a compression ignition engine (i.e., diesel engine) or a spark ignition engine (e.g., gasoline engine). For most heavy work machines, the power unit is in the form of a diesel engine having better lugging, pull-down and torque characteristics for associated work operations.

Implements are trending to the increased use of electrically driven components. For example, a planter historically had a ground driven line shaft extending across the front of the tool bar that drove the various mechanisms of each row unit, such as the seed meter, insecticide and/or herbicide meter, etc. Thus, all of the mechanisms for each row unit were dependent upon the ground speed of the planter. Many planters now use independently driven electric seed meters, electric herbicide meters, etc. for each row unit, so that there is more accurate control over the product being dispensed on a row by row basis.

Since the output power of the tow vehicle (e.g., tractor) is limited, auxiliary power onboard the implement can be used to drive the various electric components. The auxiliary power system for an implement can be provided by an on-board hydraulically driven alternator. Implements are migrating to an increasing number of electrically driven components for more accurate control. As such, the number of electrically driven components will vary depending upon the size of the machine, e.g., 12 row versus 24 row, and also by the options installed on the machine, i.e., electric seed meters, herbicide meters, insecticide meters, seed tubes for population monitoring, etc. Current designs use a worst case scenario and size and drive the auxiliary power system to the highest electrical load demand possible on a given machine. This methodology does not optimize the drive efficiency of the tow vehicle, resulting in wasted power and fuel consumption, whenever the maximum level of power is not required.

What is needed in the art is an auxiliary power system for an agricultural implement that can be optimized for different configurations of electric components onboard the implement.

SUMMARY OF THE INVENTION

The present invention optimizes power efficiency for an implement auxiliary power system by adjusting the operating speed of the hydraulically driven alternator based upon either the cumulative amperage demand of the onboard electric components or the ground speed of the implement.

Power can be optimized by dynamically optimizing auxiliary power demand based upon either a dynamic total cumulative power demand, which provides for the greatest level of optimization, and/or a more simplistic approach of using ground speed based dynamic adjustment. Software can be used in conjunction with variable inputs and/or sensors to make a decision as to the actions required and then drive those actions from an onboard controller to a variable flow hydraulic control drive, thus changing the hydraulic flow requirements necessary to drive the alternator. Flow can be minimized during low power demand periods and increased during high power demand periods.

The invention in one form is directed to an auxiliary power system for an agricultural implement, including a variable speed hydraulic drive motor configured for receiving hydraulic oil from a tow vehicle, an electric alternator coupled with and driven by the hydraulic drive motor, and at least one auxiliary electrical component onboard the implement which is coupled with and adapted to receive electrical power from the alternator. At least one load indicator provides an indication of a dynamic cumulative electrical load of the one or more auxiliary electrical components. An electrical processing circuit is coupled with the at least one load indicator and the hydraulic drive motor, and is configured to vary the speed of the hydraulic drive motor, dependent on the indicated dynamic cumulative electrical load.

The invention in another form is directed to a method of operating an auxiliary power system for an agricultural implement, including the steps of: rotatably driving an electric alternator using a variable speed hydraulic drive motor which is configured for receiving hydraulic oil from a tow vehicle; electrically powering at least one auxiliary electrical component onboard the implement using electrical power from the alternator; indicating a dynamic cumulative electrical load of the at least one auxiliary electrical component; and varying the speed of the hydraulic drive motor, dependent on the indicated dynamic cumulative electrical load, using an electrical processing circuit which is coupled with the hydraulic drive motor.

An advantage of the present invention is optimization of hydraulic flow of the tow vehicle resulting in lower heat generation and an overall reduction in power requirements which translates to lower operating cost in the form of reduced fuel cost.

Another advantage is that the operating life of the onboard auxiliary power generating device would also be increased by reducing the average operating speed, resulting in less wear on drive components and extending service life.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
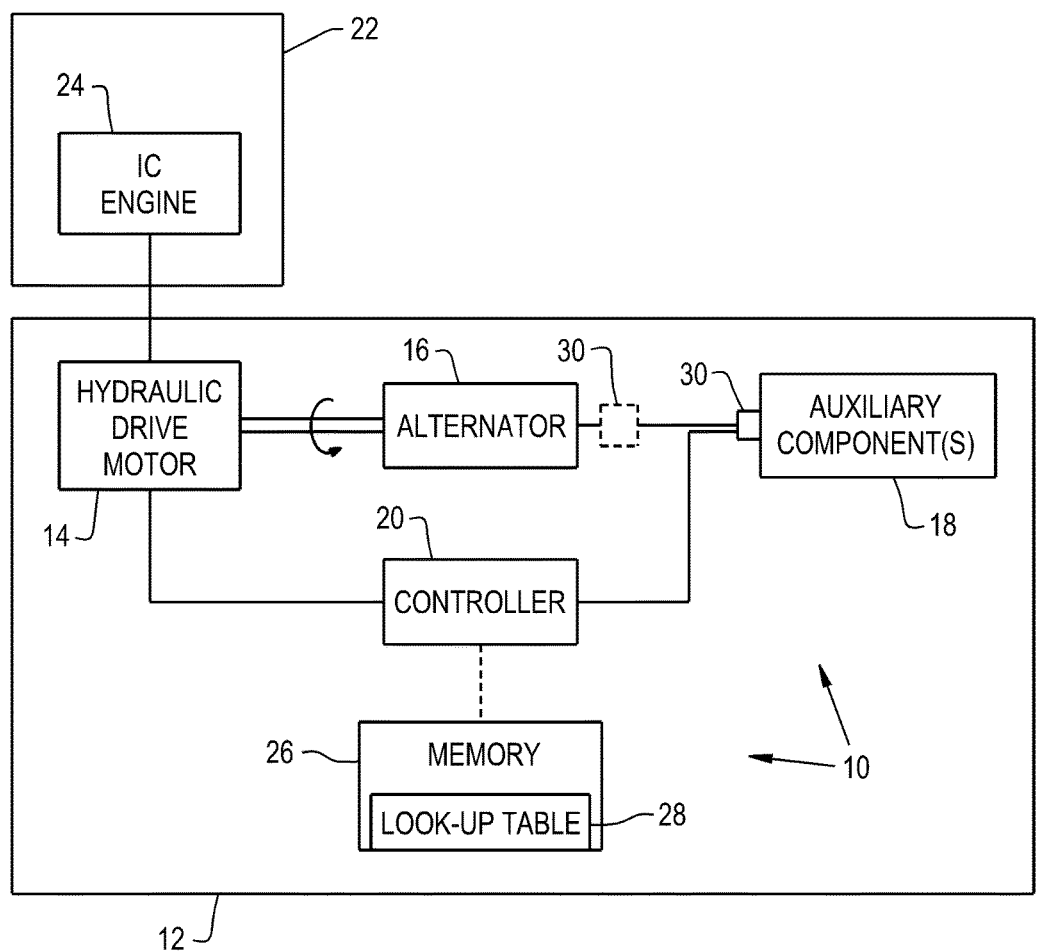
FIG. 1 is a schematic illustration of an embodiment of an auxiliary power system of the present invention which can be used with an agricultural implement.

Referring now to the drawings, and more particularly to FIG. 1, there is shown a schematic illustration of an auxiliary power system 10 of the present invention, which can be used with an agricultural implement 12, such as an agricultural planter, seeder, etc. Auxiliary power system 10 generally includes a variable speed hydraulic drive motor 14, electric alternator 16, one or more auxiliary components 18, and an electrical processing circuit 20.

The hydraulic drive motor 14 is rotatably driven by the prime mover onboard the tow vehicle 22, typically in the form of an IC engine 24. The IC engine 24 can be configured as a diesel engine, or in other embodiments configured as a gasoline engine, propane engine, etc. Typically the IC engine 24 drives internal hydraulics within the tow vehicle 22, which are connected with hydraulic remotes locates at the rear of the tow vehicle. The hydraulic remotes can be fluidly coupled via suitable fluid connectors with the hydraulic drive motor 14 to thereby provide hydraulic power to the hydraulic drive motor 14. It may also be possible to power the hydraulic drive motor 14 in other ways, such as via a mechanical connection through a rotatable shaft, chain, etc.

The hydraulic drive motor 14 is coupled with and under the control of the electrical processing circuit, shown as a controller 20 in the illustrated embodiment. The hydraulic drive motor 14 is shown as having a hardwired connection with the controller 20, but could also be coupled via other suitable connections such as a CAN bus, wireless connection, etc.

The electric alternator 16 is likewise rotatably driven by the hydraulic drive motor 14, and has an electrical output that increases or decreases dependent upon the operational speed. Typically the voltage level remains substantially constant, while the amperage level can vary with the operational speed.

The one or more auxiliary components 18 are carried onboard the implement 12 and define various controllable electric components onboard the implement 12. For example, in the case of a planter, the auxiliary components 18 can be in the form of controllable electric drives for seed meters, herbicide meters and/or insecticide meters. Such drives could be configured as an electric motor, pump, etc. The implement 12 can include other types of auxiliary components 18, depending upon the type of implement and other application parameters.

The electrical processing circuit/controller 20 is coupled with the hydraulic drive motor 14, and is configured to vary the speed of the hydraulic drive motor 14, and in turn vary the electrical output from the alternator 16. Although the electrical processing circuit is shown as a controller 20 in the illustrated embodiment, it is to be understood that the electrical processing circuit can be configured with other types of electronic and/or electrical configurations, including any suitable combination of digital, analog and/or ASIC circuitry, etc. Moreover, the electrical processing circuit can be programmed with any suitable software to carry out the desired functionality described herein.

The electrical processing circuit 20 can also include a memory 26, which can be integral with or spatially separate from the electrical processing circuit 20 (as indicated by the dashed line interconnecting between the two). The memory 26 can also include a look-up table 28 for storing relevant data, as described below.

According to an aspect of the present invention, the auxiliary power system 10 also includes one or more load indicators 30 for indicating a dynamic cumulative electrical load of the at least one auxiliary electrical component 18. The simple block shown in FIG. 1 could represent 1 or 20, or some other number of auxiliary electrical components 18. In the illustrated embodiment, each auxiliary component 18 has an associated load indicator 30. In another embodiment, indicated by the alternate position of the load indicator 30 shown in dashed lines, the load indicator can be located at the output of the alternator 16 and used to determine the cumulative loads of all of the auxiliary components 18 located onboard the implement 12.

The electrical processing circuit 20 is coupled with the load indicator(s) 30 and receives one or more output signals from the load indicators 30 indicative of the dynamic cumulative electrical loads by the auxiliary components 18. The electrical processing circuit 20 is configured to vary the speed of the hydraulic drive motor 14, dependent on the dynamic indicated cumulative electrical load.

The one or more load indicators 30 can be configured as any desirable combination of indicators of the dynamic indicated cumulative electrical load by the auxiliary components 18. For example, the one or more load indicators can be configured as:

a plurality of amperage sensors (as shown in the solid lines in FIG. 1), with each amperage sensor being associated with a respective auxiliary electrical component 18;

an amperage sensor positioned in association with an output from the alternator (as shown in the dashed lines in FIG. 1) to sense a cumulative amperage draw on the alternator;

a ground speed indicator;

a power supply voltage; or a pressure sensor associated with an outlet from the hydraulic drive motor.

If the load indicator(s) is configured as a ground speed indicator, the load indicator can be configured, e.g., as one or more sensors which sense a position of a hydrostatic lever, a position of a throttle, a gear shift position, a ground speed radar, etc, all of which are known and thus not described further. Configured as a ground speed indicator, the electrical processing circuit 20 can be configured for: determining a configuration of all of the auxiliary electrical components carried onboard the implement; and predicting the indicated dynamic cumulative electrical load of all of the auxiliary electrical components dependent upon an indicated ground speed from the ground speed indicator. The loads by each auxiliary component 18 are related to the ground speed, and to that end can either be calculated or stored in the memory 26. For example, the look-up table 28 can include data corresponding to the amperage draw of each auxiliary electrical component 18 based upon the indicated ground speed, and the electrical processing circuit 20 can use this data to calculate the indicated dynamic cumulative electrical load. The electrical processing circuit 20 can compare this calculated cumulative load with the output from the alternator 16, and then increase or decrease the operating speed of the hydraulic drive motor 14 to thereby increase or decrease the output level from the alternator 16, dependent upon the indicated dynamic cumulative electrical load.

More specifically, the electrical processing circuit 20 can compare the indicated dynamic cumulative electrical load with an instantaneous output level from the alternator 16. If the dynamic cumulative electrical load is greater than the instantaneous output level from the alternator 16, then the electrical processing circuit 20 can increase the operating speed of the hydraulic drive motor 14 to thereby increase the output level from the alternator 16. On the other hand, if the dynamic cumulative electrical load is less than the instantaneous output level from the alternator 16, then the electrical processing circuit 20 can decrease the operating speed of the hydraulic drive motor 14 to thereby decrease the output level from the alternator 16. The operating speed of the hydraulic drive motor 14 can be increased or decreased in either a stepwise or continuously variable manner.

Figure 2:
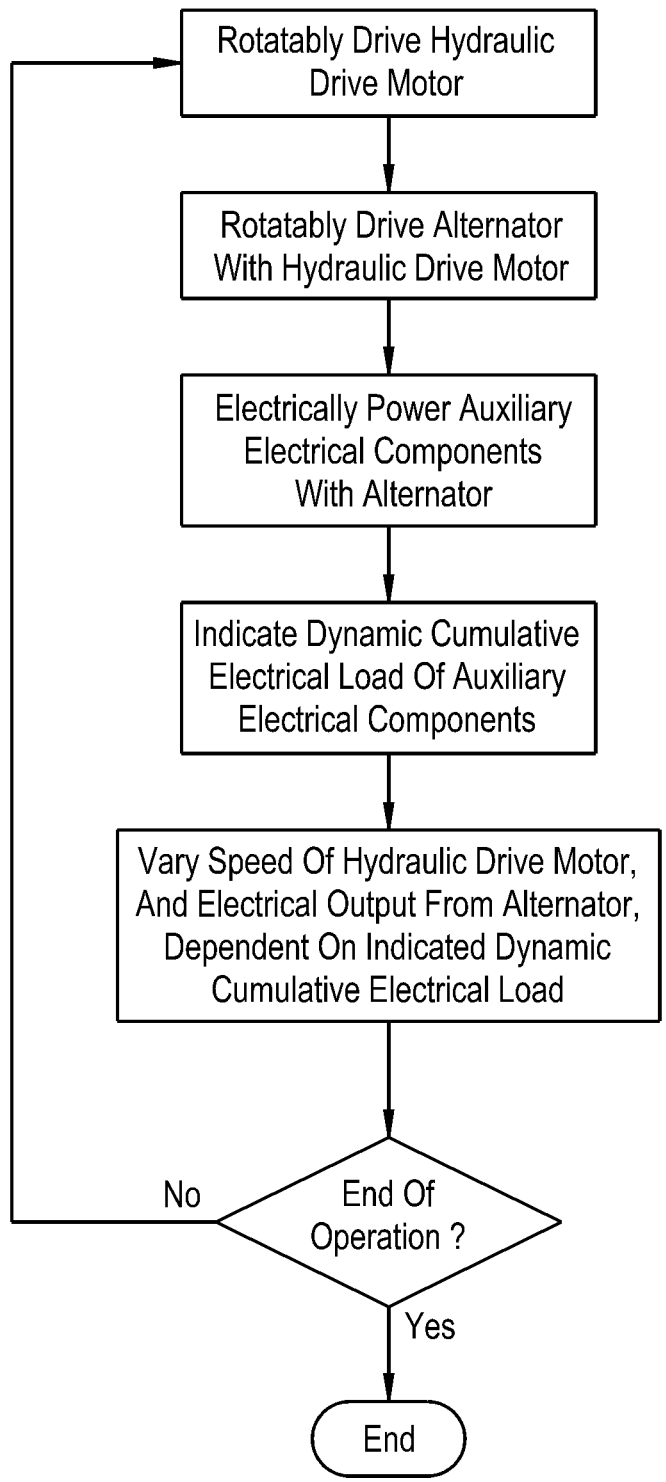
FIG. 2 is a flowchart of an embodiment of a method of the present invention for operating the auxiliary power system shown in FIG. 1.

Referring now to FIG. 2, there is shown a flowchart of an embodiment of a method of the present invention for operating the auxiliary power system shown in FIG. 1. The flowchart shown in FIG. 2 is a high level flowchart, with the details of the various functions of the load indicators 30 and electrical processing circuit 20 being incorporated therein as described above.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An auxiliary power system for an agricultural implement, comprising:
a variable speed hydraulic drive motor configured for receiving hydraulic oil from a tow vehicle;
an electric alternator coupled with and driven by the hydraulic drive motor;
at least one auxiliary electrical component, onboard the implement, which is coupled with and adapted to receive electrical power from the alternator;
at least one load indicator for indicating a dynamic cumulative electrical load of the at least one auxiliary electrical component; and
an electrical processing circuit coupled with the at least one load indicator and the hydraulic drive motor, the electrical processing circuit being configured to vary the speed of the hydraulic drive motor, dependent on the indicated dynamic cumulative electrical load,
wherein the electrical processing circuit
compares the indicated dynamic cumulative electrical load with an instantaneous output level from the alternator; and
if the dynamic cumulative electrical load is greater than the instantaneous output level from the alternator, then increases the operating speed of the hydraulic drive motor to thereby increase the output level from the alternator; or
if the dynamic cumulative electrical load is less than the instantaneous output level from the alternator, then decreases the operating speed of the hydraulic drive motor to thereby decrease the output level from the alternator.

2. The auxiliary power system of claim 1, wherein the at least one load indicator comprises one of:
a plurality of amperage sensors, each said amperage sensor being associated with a respective said auxiliary electrical component;
an amperage sensor positioned in association with an output from the alternator to sense a cumulative amperage draw on the alternator;
a ground speed indicator;
a power supply voltage; or
a pressure sensor associated with an outlet from the hydraulic drive motor.

3. The auxiliary power system of claim 1, wherein the at least one load indicator includes a ground speed indicator, and the electrical processing circuit is configured for:
determining a configuration of all of the auxiliary electrical components carried onboard the implement; and
predicting the indicated dynamic cumulative electrical load of all of the auxiliary electrical components dependent upon an indicated ground speed from the ground speed indicator.

4. The auxiliary power system of claim 3, wherein the electrical processing circuit includes a memory having a look-up table with data corresponding to amperage draw of each auxiliary electrical component based upon the indicated ground speed, and calculates the indicated dynamic cumulative electrical load based upon the data in the look-up table.

5. The auxiliary power system of claim 4, wherein the electrical processing circuit is configured for increasing or decreasing the operating speed of the hydraulic drive motor to thereby increase or decrease the output level from the alternator, dependent upon the indicated dynamic cumulative electrical load.

6. The auxiliary power system of claim 5, wherein the electrical processing circuit is configured to increase or decrease the operating speed of the hydraulic drive motor in either a stepwise or continuously variable manner.

7. The auxiliary power system of claim 1, wherein the electrical processing circuit is configured to increase or decrease the operating speed of the hydraulic drive motor in either a stepwise or continuously variable manner.

8. A method of operating an auxiliary power system for an agricultural implement, comprising the steps of:
rotatably driving an electric alternator using a variable speed hydraulic drive motor which is configured for receiving hydraulic oil from a tow vehicle;
electrically powering at least one auxiliary electrical component onboard the implement using electrical power from the alternator;
indicating a dynamic cumulative electrical load of the at least one auxiliary electrical component; and
varying the speed of the hydraulic drive motor, dependent on the indicated dynamic cumulative electrical load, using an electrical processing circuit which is coupled with the hydraulic drive motor,
wherein the electrical processing circuit
compares the indicated dynamic cumulative electrical load with an instantaneous output level from the alternator; and
if the dynamic cumulative electrical load is greater than the instantaneous output level from the alternator, then increases the operating speed of the hydraulic drive motor to thereby increase the output level from the alternator; or
if the dynamic cumulative electrical load is less than the instantaneous output level from the alternator, then decreases the operating speed of the hydraulic drive motor to thereby decrease the output level from the alternator.

9. The method of operating an auxiliary power system of claim 8, wherein the at least one load indicator comprises one of:
- a plurality of amperage sensors, each said amperage sensor being associated with a respective said auxiliary electrical component;
- an amperage sensor positioned in association with an output from the alternator to sense a cumulative amperage draw on the alternator;
- a ground speed indicator;
- a power supply voltage; or
- a pressure sensor associated with an outlet from the hydraulic drive motor.

10. The method of operating an auxiliary power system of claim 9, wherein the at least one load indicator includes a ground speed indicator, and the electrical processing circuit is configured for:
- determining a configuration of all of the auxiliary electrical components carried onboard the implement; and
- predicting the indicated dynamic cumulative electrical load of all of the auxiliary electrical components dependent upon an indicated ground speed from the ground speed indicator.

11. The method of operating an auxiliary power system of claim 10, wherein the electrical processing circuit includes a memory having a look-up table with data corresponding to amperage draw of each auxiliary electrical component based upon the indicated ground speed, and calculates the indicated dynamic cumulative electrical load based upon the data in the look-up table.

12. The method of operating an auxiliary power system of claim 11, wherein the electrical processing circuit is configured for increasing or decreasing the operating speed of the hydraulic drive motor to thereby increase or decrease the output level from the alternator, dependent upon the indicated dynamic cumulative electrical load.

13. The method of operating an auxiliary power system of claim 12, wherein the electrical processing circuit is configured to increase or decrease the operating speed of the hydraulic drive motor in either a stepwise or continuously variable manner.

14. The method of operating an auxiliary power system of claim 8, wherein the electrical processing circuit is configured to increase or decrease the operating speed of the hydraulic drive motor in either a stepwise or continuously variable manner.

* * * * *